April 13, 1937. W. J. PEARMAIN 2,077,154
CLUTCH
Filed Oct. 30, 1935 2 Sheets-Sheet 1
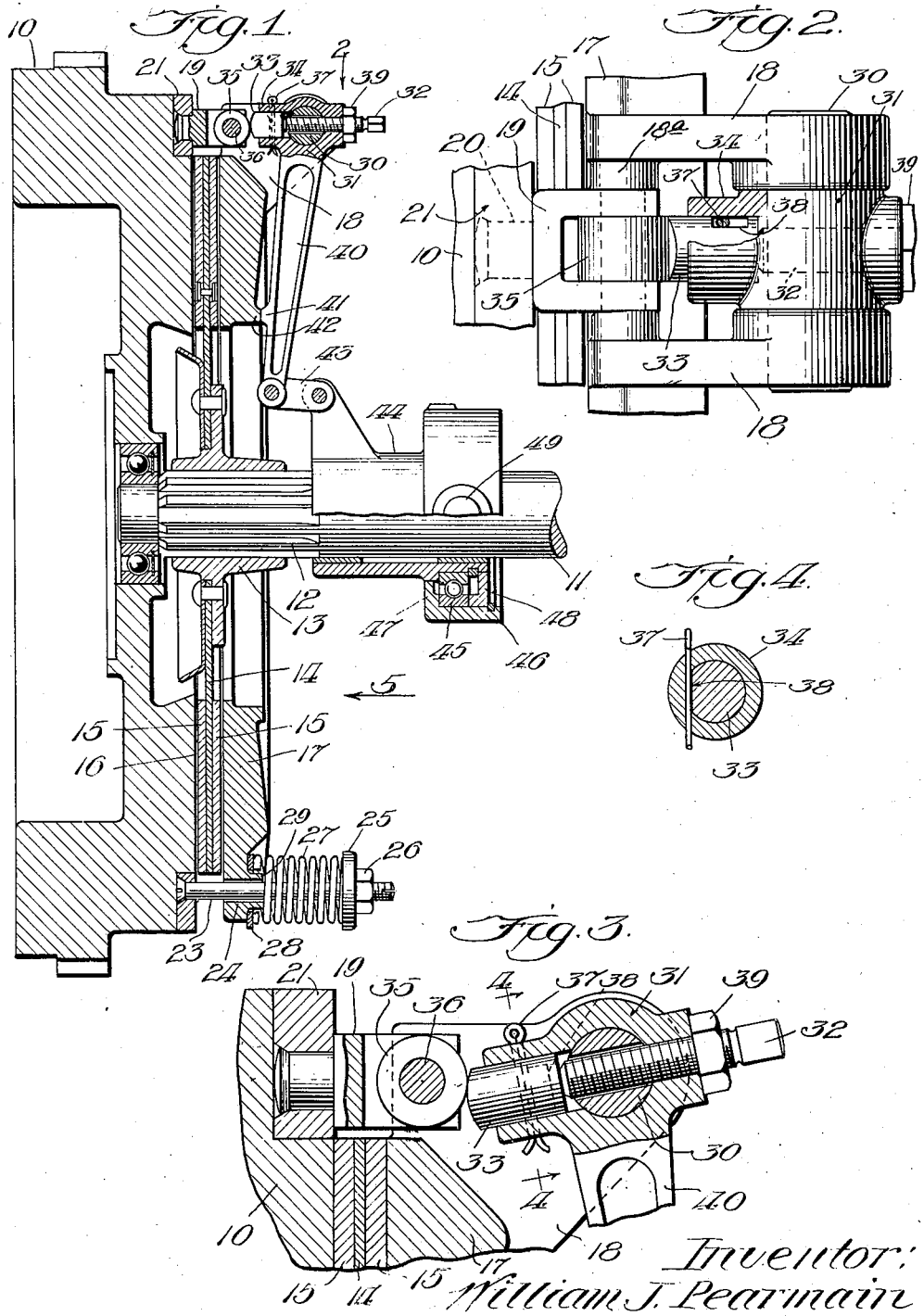
Inventor:
William J. Pearmain
by Davis, Macauley, May, Lindsey & Smith
Attys.

Inventor:
William J. Pearmain

Patented Apr. 13, 1937

2,077,154

UNITED STATES PATENT OFFICE 2,077,154

CLUTCH

William J. Pearmain, Racine, Wis., assignor to Twin Disc Clutch Company, Racine, Wis., a corporation of Wisconsin Application October 30, 1935, Serial No. 47,453

7 Claims. (Cl. 192—68)

My invention relates to clutches and is concerned more particularly with a clutch in which transmission of power is effected between rotary parts through mechanism which is normally in driving engagement.

One object of my invention is to devise a clutch in which the unloading mechanism includes parts mounted directly on the floating plate and flywheel, or other rotary part, respectively, avoiding the usual necessity for employing a cover plate or the like, and thereby materially simplifying the clutch structure.

A further object is to provide a clutch in which the unloading mechanism is so constructed and arranged that its release position is maintained by the extending action of the loading springs.

A further object is to devise a clutch in which the principal element of the unloading mechanism is a bell crank lever pivoted on the floating plate and one arm of which bears against the other gripping member of the clutch whereby the floating plate is shifted to release position, the arm being rocked to an over center position to enable the loading springs to maintain the clutch in disengagement without additional holding means.

A further object is to provide a clutch as above indicated in which the driving elements are secured to a ring that is capable of being attached to a flywheel or other rotary part, the elements engaging the floating plate and serving as fulcrums for the releasing movement of the unloading mechanism.

These and further objects of my invention will be set forth in the following specification, reference being had to the accompanying drawings, and the novel means by which said objects are effectuated will be definitely pointed out in the claims.

In the drawings:

Figure 1 is a sectional elevation of my improved clutch as viewed along the line 1—1 in Fig. 5, looking in the direction of the arrows, showing the several parts in released position.

Fig. 2 is an enlarged plan view of the unloading mechanism, looking in the direction of the arrow 2 in Fig. 1.

Fig. 3 is an enlarged, sectional and fragmentary view, showing the position assumed by the unloading mechanism when the clutch is engaged.

Fig. 4 is a detail sectional view, taken along the line 4—4 in Fig. 3, looking in the direction of the arrows.

Referring to Fig. 1, the numerals 10 and 11 designate, respectively, a flywheel and a shaft, which, for purpose of illustration may be regarded generally as the driving and driven members of the clutch. One end of the shaft is splined as at 12 to receive a hub 13 which is thereby compelled to partake of the rotary motion of the shaft, but is adapted for axial movement therealong. The hub has secured thereto a friction plate 14 which is provided on opposite sides, as by riveting or the like, with facings of frictional material 15.

Figure 5:
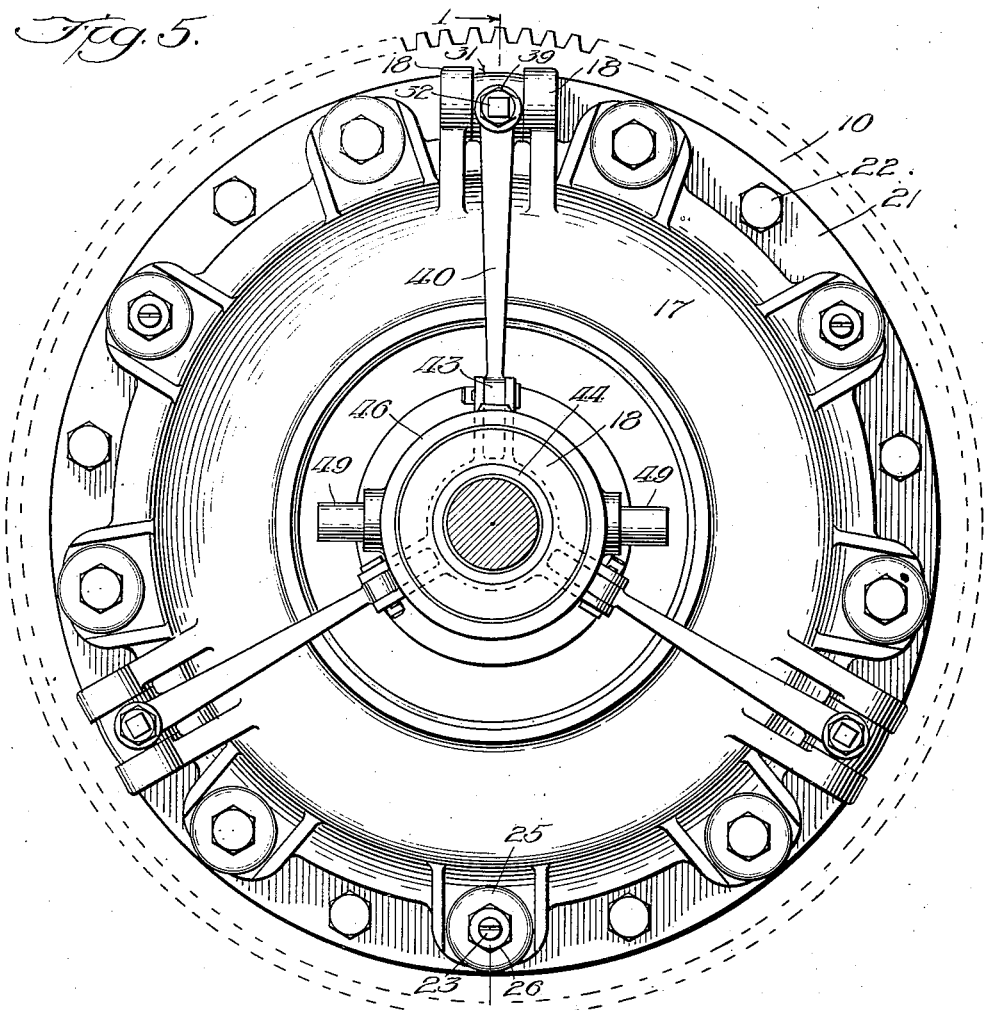
Fig. 5 is an end elevation of the clutch, as viewed in the direction of the arrow 5 in Fig. 1.

The left facing, as viewed in Fig. 1, is intended to engage with the face 16 of the flywheel, while the other facing engages with the opposed side or face of a floating plate 17. Around its periphery, the plate 17 is provided with a plurality of pairs of ears 18, each of which is provided on its inner face with a boss 18ª, and between the inner faces of each pair of these bosses extends the limbs of a fork 19 that is provided with a stud end 20 fastened in a ring 21 that is secured to the flywheel by means of bolts 22 (see Fig. 5). The forks 19, in addition to acting as a support for parts hereinafter described, provide for the necessary driving engagement between the flywheel and the floating plate, while allowing for axial movement of the floating plate relative to the flywheel (see Fig. 2).

A plurality of screws 23 are circumferentially spaced in and around the ring 21 and their shanks pass freely through apertures 24 provided in the floating plate to receive on the extremities retaining nuts 26 and cup washers 25. A loading spring 27 encircles each of the screws 23, with one end thereof bearing against the washer 25 and the opposite end against a washer 28 which encircles a centering boss 29 that may be formed by suitably recessing the external face of the floating plate. The normal action of the springs 27 is to apply the necessary pressure to the floating plate so that the friction plate 14 is gripped between the flywheel and the floating plate. Preferably the washers 28 are formed of asbestos or other material whereby the springs are protected from what would otherwise be directly conducted heat from the floating plate. The screws 23 only serve as a locating element for the loading springs and do not serve to transmit any of the driving force from the flywheel to the floating plate, the latter action being a function of the forks 19.

One of the most important features of my improved clutch resides in the novel construction of the unloading mechanism and this portion of the device will now be described. A pin 30 is bridged between and freely rotatable in each pair of ears 18 and the hub of a bell crank lever 31 is mounted on that portion of the pin between the ears.

An adjusting screw 32 is threaded through the lever hub and passes freely through an aperture provided in the pin 30 so that the lever is journaled in the ears 18, rather than upon the pin 30. The inner extremity of the screw 32 bears against the inner flat end of a cylindrical block 33 that is slidable in a stub arm 34 whose open end faces outwardly toward the fork 19. The outer end of the block 33 is preferably rounded for engagement with the surface of a roller 35 that is pivoted on a pin 36 bridged between the limbs of the fork 19. Endwise movement of the block 33 is limited by a cotter pin 37 that passes through the stub arm 34 and engages the base of a slot 38 formed by milling one side of the block 33 (see Fig. 4). The purpose of the adjusting screw 32 is to vary the length of one of the lever arms, as formed by the stub arm 34 and block 33, in order to compensate for the wear of the friction facings 15. The adjusted position of the screw 32 may be locked by a nut 39.

The other arm 40 of the bell crank lever extends inwardly toward the shaft 11 and at a suitable intermediate point may be provided with a boss 41 that contacts a similar boss 42 provided on the floating plate in order to limit the position of the arm 40 when the clutch is disengaged. The inner extremity of the arm 40 is pivotally connected to one end of a link 43 whose opposite end is pivotally connected to a sleeve 44 that is freely slidable along the shaft 11. It will be understood that the construction of the bell crank lever, as above described, is identical for all of the levers of the clutch and that as many of these bell crank levers may be employed as operating conditions require. The inner race of a ball bearing 45 is mounted upon the sleeve 44 and the outer race of this bearing is closely fitted in a collar 46 that is provided at one end with a flange 47 for retaining the bearing 45 against endwise movement in one direction. Movement of the bearing in the opposite direction is prevented by a retaining ring 48. The collar 46 is provided with the usual trunnions 49 that are intended to engage with a suitable shifting fork (not shown). By reason of the foregoing construction, it is evident that the collar 46 will shift the sleeve 44 along the shaft 11, but will not partake of the rotary movement of the sleeve.

As shown in Fig. 3, the various members of the clutch are in driving position, owing to the pressure furnished by the springs 27 which grip the friction plate 14 between the flywheel 10 and the floating plate 17. To release the clutch and thus interrupt the flow of power from the flywheel to the shaft, the sleeve 44 is moved along the shaft toward the left, as viewed in Fig. 1, thus causing a movement of the lever arms 40 toward the floating plate. During this movement, the rounded ends of the blocks 33 bear against the rollers 35 as fulcrums and thus shift the floating plate toward the right against the extending action of the springs 27. This rocking action of the bell crank levers is continued until the blocks 33 reach the over-center position, relative to the center of the rollers 35, as indicated in Fig. 1, and at this time, the bosses 41 and 42 also contact. Further movement of the bell crank levers by the sleeve 44 is thereby prevented and, because of the over-center relation above referred to, the disengaged position of the floating plate is maintained by the action of the loading springs themselves. During this release shifting of the floating plate, it will be understood that, owing to the free mounting of the friction plate 14, it will accommodate itself endwise of the shaft 11 so that it will be substantially freed of engagement with the flywheel 10. As the facings 15 wear, the short arm of each bell crank lever can be literally lengthened by adjusting the block 33 outwardly in order to achieve the required contact thereof with the rollers 35 and so retain the full releasing capacity of the levers. Preferably, and as clearly indicated in Figs. 1 and 3, the distance of the axis of each pin 30 radially from the shaft 11 is greater than the similar distance of each pin 36, thus providing for a quick release of the bell crank levers when moved toward the right by the sleeve 44, this movement obviously releasing the floating plate 17 so that it may be shifted into driving position by the springs 27.

Figure 6:
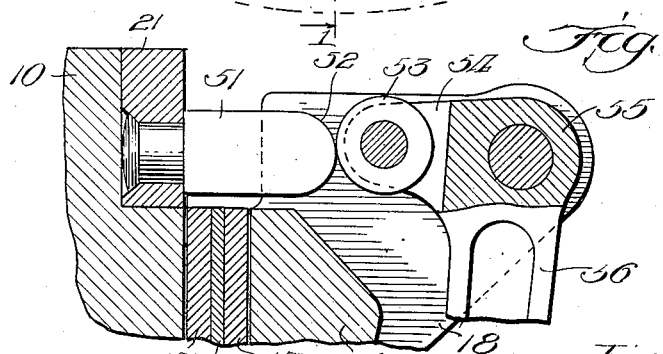
Fig. 6 is a fragmentary, sectional view, corresponding to that illustrated in Fig. 3, but illustrating a modified type of unloading mechanism, the clutch being shown in disengaged position.

The modification illustrated in Fig. 6 differs from that heretofore described in that no provision is made for adjustment. In this arrangement, driving pins 51, corresponding to the driving forks 19 have their outer ends rounded as at 52 for engagement with a roller 53 that is pivoted in a bifurcated arm 54 of a bell crank lever 55, the arm serving the same purpose as the stub arm 34 and the block 33, and the other arm 56 extending inwardly of the clutch for connection with a sleeve similar to the sleeve 44. The action of this clutch and its unloading mechanism is identical with that heretofore described.

Moreover, since the principal elements of the unloading mechanism are mounted on the floating plate, it is possible to omit the usual cover plate, thereby enabling the clutch springs 27 to be freely exposed to the surrounding air so that they are maintained in a cooler condition and hence are not as likely to acquire a permanent set due to frictional heat.

I claim:

1. In a clutch, the combination with a friction plate attachable to a rotary part, a pair of gripping members connectible to a second rotary part and disposed on opposite sides of the plate, one of said members having projections on one face thereof and the other of said members constituting a floating plate movable axially relative to the other member, and springs for maintaining the driving engagement of the members and friction plate, of unloading mechanism for releasing said engagement comprising bell crank levers rockably mounted on the floating plate, and means for actuating one arm of each lever, the other arms fulcruming against the associated projections to thereby disengage the floating plate, the radius of each lever pivot being greater than the radius of the associated projection thereby providing for a quick releasing movement of the levers to free the floating plate for return to gripping position.

2. In a clutch, the combination with a friction plate attachable to a rotary part, a pair of gripping members connectible to a second rotary part and disposed on opposite sides of the plate, one of the members having a plurality of spaced projections circumferentially arranged around the face thereof and the other member constituting a floating plate movable axially relative to the other member, and springs for maintaining the driving engagement of the members and friction plate, of unloading mechanism for releasing said engagement comprising bell crank levers rockably mounted on the floating plate, means for actuating one arm of each lever, the other lever arms fulcruming against the associated projections to thereby disengage the floating plate and moving to an over-center position relative to the cooperating projections to lock the clutch in disengaged position, and means formed on the floating plate for limiting the releasing movement of said first named lever arms to maintain said over-center position.

3. In a clutch, the combination with a friction plate attachable to a rotary part, a pair of gripping members connectible to a second rotary part and disposed on opposite sides of the plate, one of said members constituting a floating plate movable axially relative to the other member, pins mounted in said other member and having driving engagement with the floating plate, and springs for maintaining the driving engagement of the members and friction plate, of unloading mechanism for releasing said engagement comprising bell crank levers rockably mounted on the floating plate, and means for actuating one arm of each lever, the other arms fulcruming against the associated pins to thereby disengage the floating plate and moving to an over-center position relative to the cooperating pins to lock the clutch in disengaged position, the radius of each lever pivot being greater than the radius of the associated pin thereby providing for a quick releasing movement of the levers to free the floating plate for return to gripping position.

4. In a clutch, the combination with a friction plate attachable to a rotary part, a pair of gripping members connectible to a second rotary part and disposed on opposite sides of the plate, one of the members having a plurality of spaced projections circumferentially arranged around the face thereof and the other member constituting a floating plate movable axially relative to the other member, and springs for maintaining the driving engagement of the members and friction plate, of unloading mechanism for releasing said engagement comprising bell crank levers rockably mounted on the floating plate, means for actuating one arm of each lever, the other lever arms fulcruming against the associated projections to thereby disengage the floating plate and moving to an over-center position relative to the cooperating projections to lock the clutch in disengaged position, and means formed on the floating plate for limiting the releasing movement of said first-named lever arms to maintain said over-center position, the radius of each lever pivot being greater than the radius of the associated projection thereby providing for a quick releasing movement of the levers to free the floating plate for return to gripping position.

5. In a clutch, the combination with a friction plate attachable to a rotary part and freely movable axially relative thereto, a pair of gripping members connectible to a second rotary part and disposed on opposite sides of the plate, one of the members having projections on one face thereof and secured against axial movement and the other of the members constituting a floating plate movable axially relative to the other member, and springs for maintaining the driving engagement of the members and friction plate, of unloading mechanism for releasing said engagement comprising pins journaled on the floating plate, a bell crank lever mounted on each pin, means for actuating one arm of each lever, the other arm having an adjustable block adapted to fulcrum against the associated projection to thereby disengage the floating plate and the ends of the fulcruming lever arms being shifted to an over-center position with respect to the cooperating projections to thereby lock the clutch in disengaged position, and means for adjusting the position of each block as the clutch wears, said adjusting means passing through the pins to secure the levers thereto.

6. In a clutch, the combination with a friction plate attachable to a rotary part, a pair of gripping members connectible to a second rotary part and disposed on opposite sides of the plate, one of the members constituting a floating plate movable axially relative to the other member, projections formed on the other member having driving engagement with the floating plate, and springs for maintaining the driving engagement of the members and friction plate, of unloading mechanism for releasing said engagement comprising pins journaled on the floating plate, a bell crank lever mounted on each pin, means for actuating one arm of each lever, the other arm having an adjustable block adapted to fulcrum against the associated projection to thereby disengage the floating plate and moving to an over-center position relative to the co-acting projection to lock the clutch in disengaged position, the radius of each pin being greater than the radius of the associated projection to thereby provide for a quick releasing movement of the levers to free the floating plate for return to gripping position, and means for adjusting the position of each block as the clutch wears, said adjusting means passing through the pins to secure the levers thereto.

7. In a clutch, the combination with a friction plate attachable to a rotary part, a pair of gripping members connectible to a second rotary part and disposed on opposite sides of the plate, one of the members having a plurality of spaced projections circumferentially arranged around the face thereof and the other member constituting a floating plate movable axially relative to the other member, and springs for maintaining the driving engagement of the members and friction plate, of unloading mechanism for releasing said engagement comprising pins journaled on the floating plate, a bell crank lever mounted on each pin, means for actuating one arm of each lever, the other arm having an adjustable block adapted to fulcrum against the associated projection to thereby disengage the floating plate and moving to an over-center position relative to the cooperating projection to lock the clutch in disengaged position, means formed on the floating plate for limiting the releasing movement of the first-named lever arms to maintain said over-center position, the radius of each lever pivot being greater than the radius of the associated projection to thereby provide for a quick releasing movement of the levers to free the floating plate for return to gripping position, and means for adjusting the position of each block as the clutch wears, the adjusting means passing through the pins to secure the levers thereto.

WILLIAM J. PEARMAIN.